US012779307B2

(12) United States Patent
Gray et al.

(10) Patent No.: US 12,779,307 B2
(45) Date of Patent: Nov. 3, 2026

(54) BLOCK SLED

(71) Applicants: Richard John Gray, Galashiels (GB); Anthony John Locke, Somerset (GB)

(72) Inventors: Richard John Gray, Galashiels (GB); Anthony John Locke, Somerset (GB)

( * ) Notice: Subject to any disclaimer, the term of this patent is extended or adjusted under 35 U.S.C. 154(b) by 0 days.

(21) Appl. No.: 15/907,311

(22) Filed: Feb. 28, 2018

(65) Prior Publication Data

US 2019/0262689 A1 Aug. 29, 2019

(51) Int. Cl.

*A63B 69/34* (2006.01)
*A63B 23/04* (2006.01)
*G09B 19/00* (2006.01)

(52) U.S. Cl.

CPC ............ *A63B 69/34* (2013.01); *A63B 23/047* (2013.01); *G09B 19/0038* (2013.01); *A63B 2209/00* (2013.01); *A63B 2209/02* (2013.01); *A63B 2209/10* (2013.01); *A63B 2220/12* (2013.01); *A63B 2220/30* (2013.01); *A63B 2220/40* (2013.01); *A63B 2220/56* (2013.01); *A63B 2220/833* (2013.01); *A63B 2225/09* (2013.01); *A63B 2225/50* (2013.01); *A63B 2243/0066* (2013.01); *A63B 2243/007* (2013.01)

(58) Field of Classification Search

CPC ......... A63B 21/02; A63B 21/05; A63B 22/00; A63B 22/02; A63B 69/00; A63B 69/34

See application file for complete search history.

(56) References Cited

U.S. PATENT DOCUMENTS

| | | | | | |
|---|---|---|---|---|---|
| 3,997,160 | A * | 12/1976 | George | A63B 69/34 | 482/129 |
| 4,508,341 | A * | 4/1985 | Carrington | A63B 21/021 | 482/130 |
| 4,802,670 | A * | 2/1989 | Smith | A63B 69/34 | 473/445 |
| 6,261,194 | B1 * | 7/2001 | Hadar | A63B 69/34 | 473/445 |
| 6,309,327 | B1 * | 10/2001 | Hallberg | A63B 69/34 | 482/90 |
| 6,942,585 | B1 * | 9/2005 | Krause | A63B 69/002 | 473/445 |
| 2003/0013584 | A1 * | 1/2003 | Harney | A63B 22/02 | 482/8 |
| 2005/0250084 | A1 * | 11/2005 | Bright | A63B 69/34 | 434/251 |

(Continued)

*Primary Examiner* — Joseph B Baldori
*Assistant Examiner* — Christopher Glenn
(74) *Attorney, Agent, or Firm* — MaxGoLaw PLLC

(57) ABSTRACT

A training apparatus having a base and an upright collision surface which is configured to pivot relative to the base about a transverse axis or configured in relation to the base to provide at least one predetermined limited degree of freedom of movement between the base and the collision surface and/or configured to rotate about an upright axis provides enables development of improved technique for collisions in contact sports such as American Football. The collision surface being is moveable and/or rotatable relative to the base mimics, in a controlled environment, a common configuration of a collision, whereby players can train on the most effective collision techniques, including enhancing power and strength direction of approach and, maintaining power at a required height against a contact surface arranged at a predetermined angle.

20 Claims, 9 Drawing Sheets

(56) References Cited

U.S. PATENT DOCUMENTS

| | | | | |
|---|---|---|---|---|
| 2006/0035734 | A1* | 2/2006 | Borunda | A63B 69/0053 473/445 |
| 2008/0026918 | A1* | 1/2008 | Lemke | A63B 21/055 482/87 |
| 2008/0058128 | A1* | 3/2008 | Joseph | A63B 69/0053 473/445 |
| 2011/0165972 | A1* | 7/2011 | Forrest, Sr. | A63B 69/002 473/445 |
| 2012/0157244 | A1* | 6/2012 | Staten | A63B 21/0004 473/445 |
| 2013/0143693 | A1* | 6/2013 | Forrest, Sr. | A63B 69/34 473/444 |
| 2014/0024480 | A1* | 1/2014 | George | A63B 21/0421 473/445 |

* cited by examiner

BLOCK SLED

FIELD OF THE INVENTION

This invention relates to the field of training apparatus. More particularly, it relates to a training apparatus for contact sports, such as American Football

BACKGROUND OF THE INVENTION

Contact or impact sports such as rugby (Rugby Union and Rugby League), American football, Aussie Rules football and Gaelic football involve various plays which require specific training to master and excel at. There are a number of training devices available to help improve the players' performance.

In American Football, the defensive linemen and linebackers protect the quarterback and keep play moving by pushing the team up the field. It is therefore important that the linemen and linebackers react well to hits or collisions from the other team in order to keep play moving forward. The linemen and linebackers are therefore trained to collide in an effective way with opposing team members.

Known football sleds are used to help improve certain aspects of a player's performance, such as for example the player's strength, speed and agility. However, whilst these sleds can be used for practising certain techniques, they do not adequately mimic a real in-game collision or provide accurate collision position feedback in order to help develop the key techniques for responding to collisions well in order to keep play moving and increase the team's performance. More particularly, they do not teach technique that facilitates safe tackling to minimise injuries of both parties in the tackle.

The present inventor has devised an apparatus that enables the aforementioned weaknesses in the ability of the known football sleds to improve collision technique to be addressed.

Problem to be Solved by the Invention

There is a need for apparatus to improve technique and to enhance training in contact sports, in particular in American Football.

It is an object of the invention to provide a sports training apparatus that can be used in developing technique in the collision area of contact sports, such as American Football, to improve one or more of the above-identified weaknesses.

It is a further object of this invention to provide a sports training apparatus and method to improve individual and team technique in effectiveness in certain aspects of contact sports, in particular in American Football.

SUMMARY OF THE INVENTION

In accordance with a first aspect of the invention, there is provided a training apparatus comprising:

- a base for supporting the apparatus; and
- a collision surface disposed in a generally upright arrangement relative to the base,
- wherein the collision surface is configured to pivot relative to the base about a transverse axis or is configured in relation to the base to provide at least one predetermined limited degree of freedom of movement between the base and the collision surface; and/or
- wherein the collision surface is configured to rotate about an upright axis.

In a second aspect of the invention, there is provided a training apparatus having a collision surface and which is movably responsive to a force transmitted by a user impacting the collision surface during use, the apparatus comprising: a base for supporting the apparatus on a training surface, the base comprising one or more training surface-contacting members defining a base plane and extending in a longitudinal direction substantially aligned with the training surface; and a collision support structure extending upwardly from the base for supporting a collision surface to be impacted by a user during use;

and wherein the base is moveably responsive to force transmitted by the user to the collision surface;

and wherein the collision support structure includes a linkage to allow relative movement between the collision surface and the base, and wherein the linkage provides at least one predetermined limited degree of freedom of movement between the base and the collision surface when force is transmitted by the user to the collision surface.

In a third aspect of the invention, there is provided an apparatus kit comprising:

a base for supporting the apparatus on a training surface, the base comprising one or more training surface-contacting members defining a base plane and extending in a longitudinal direction substantially aligned with the training surface;

a collision support structure for supporting a collision surface to be impacted by a user during use, in which the collision support structure is mountable on the base to extend upwardly therefrom; and a linkage mountable between the collision surface and the base to provide relative movement between the collision surface and the base, and wherein the linkage provides at least one predetermined limited degree of freedom of movement between the base and the collision surface when force is transmitted by the user to the collision surface, and wherein in use the base member is moveably responsive to force transmitted by the user to the collision surface.

In a fourth aspect of the invention, there is provided apparatus having a collision surface and which is movably responsive to a force transmitted by a user impacting the collision surface during use, the apparatus comprising:

a base for supporting the apparatus on a training surface, the base comprising one or more training surface-contacting members defining a base plane and extending in a longitudinal direction substantially aligned with the training surface; and a collision support structure extending upwardly from the base for supporting a collision surface to be impacted by a user during use;

and wherein the collision support structure includes a linkage providing relative movement between the collision surface and the base, and wherein the linkage provides at two predetermined limited degrees of freedom of movement between the base and the collision surface when force is transmitted by the user to the collision surface.

Advantages of the Invention

The training apparatus of the invention provides a means by which improved technique for collisions in contact sports such as American Football can be developed. By providing a collision surface which is moveable and/or rotatable relative to the base, which mimics in a controlled environment a common configuration of a collision, players can train on the most effective collision techniques, including enhancing power and strength direction of approach, maintaining power at a required height against a contact surface arranged at a predetermined angle. Furthermore, by providing a collision surface which is rotatable relative to the base, the players can train to improve the accuracy of their direction of approach and/or the strength of their approach, as rotation of the collision surface occurs if the direction of approach and/or strength of approach is incorrect or sub-optimum thereby throwing the player away from the collision surface.

The training apparatus of the invention also provides a means by which the technique for collision is improved as the invention provides a contact surface which is mounted on a base member which is moveably responsive to force transmitted by the user. The base member will only move in response to the force transmitted by the player if the player's direction of approach and/or strength of approach to the contact surface is correct or in an optimum direction. The training apparatus therefore provides the user or team of users with instant feedback as to whether the player used 'good' or 'bad' technique.

DETAILED DESCRIPTION OF THE INVENTION

Figure 1:
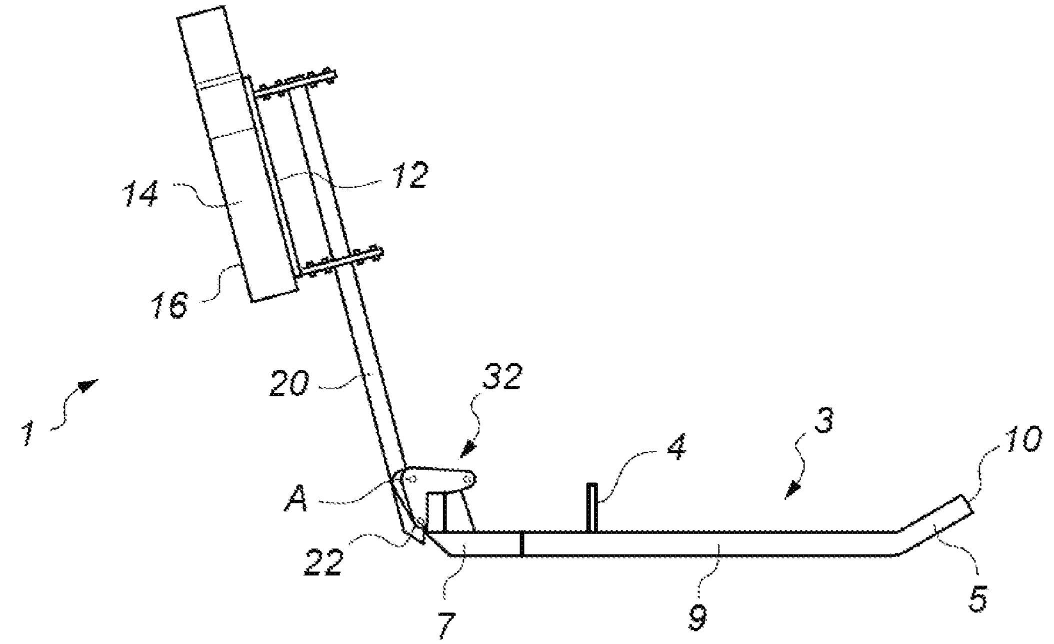
FIG. 1 is a schematic illustrating a side view of a training apparatus according to one embodiment of the present invention.
Figure 2:
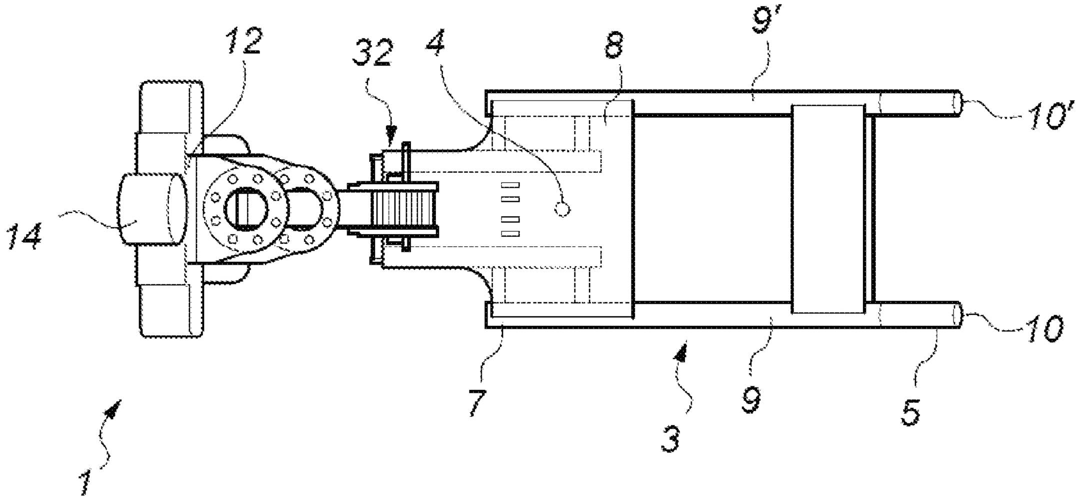
FIG. 2 is a plan view of a training apparatus according to the embodiment of the invention illustrated in FIG. 1.
Figure 3:
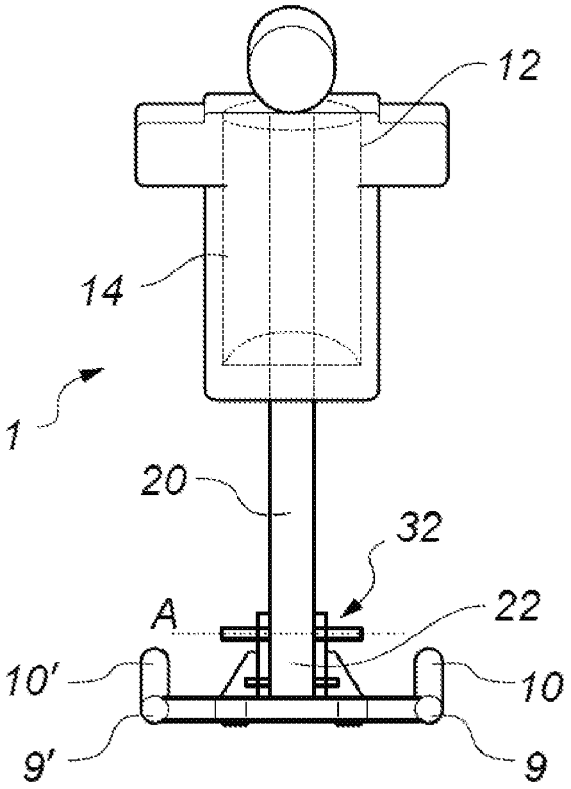
FIG. 3 is a front view of a training apparatus according to the invention illustrated in FIG. 1.
Figure 4:
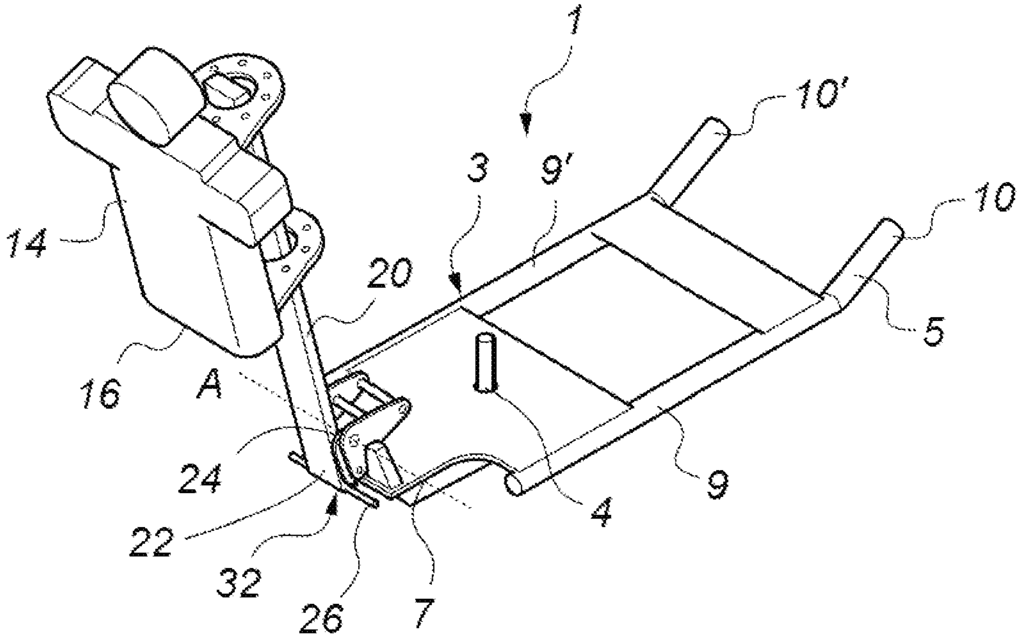
FIG. 4 is a perspective view of a training apparatus according to the invention illustrated in FIG. 1.

The training apparatus according to the present invention is adaptable or may be adapted for use in training, coaching, and technique development for several contact sports where 'collision' plays are important, such as for example and not limited to American Football. It is particularly useful in developing technique where effectiveness of direction and/or strength of collision is an important element. Preferably, the training apparatus is a blocking sled, for example for use in American football.

The training apparatus of the invention comprises a base for supporting the apparatus and a collision surface disposed in a generally upright arrangement relative to the base and preferably configured for a user to contact in a training exercise whereby a transient or sustained force or impact may be applied to the surface by a user with the aim of developing a desired technique, which in one embodiment (for field training) may cause the apparatus to move along a training surface. The base is for supporting the apparatus and preferably for supporting the apparatus on a surface such as a training surface. The base preferably comprises one or more training surface-contacting members defining a base plane.

The apparatus may be defined as having a longitudinal axis which may be considered to extend from the collision surface (or the centre point or centre of mass of the collision surface) in a direction which generally bisects the base). Where the base is an elongate member, this will typically be the same direction or the same axis as a longitudinal axis of the base such as a line of symmetry. The longitudinal direction is typically the direction that the apparatus and the base will move if a square and true force is applied consistently to the collision surface. A transverse axis is an axis parallel with a base plane and preferably orthogonal to the longitudinal axis of the apparatus.

The collision surface and the apparatus are configured such that the collision surface may move relative to the base when a force is applied by a user to the surface. The collision surface may be configured to pivot about a transverse axis relative to the base or the collision surface may be configured relative to the base to provide at least one pre-determined limited degree of freedom of movement between the base and the collision surface. Preferably, the collision surface is configured to pivot relative to the base and preferably about a transverse axis.

The collision surface may be configured to rotate about an upright axis.

Preferably the collision surface is configured to move relative to the base, as mentioned above, preferably to pivot relative to the base and is configured to rotate about an upright axis.

The upright axis may pass through the plane of the collision surface or, preferably is offset from the collision surface (but preferably parallel with the collision surface and preferably medial with or bisects the collision surface). The upright axis is typically disposed generally upright relative to the longitudinal axis of the apparatus or the base plane, preferably, the upright axis is generally coplanar with the longitudinal axis and disposed within a 45 degree angle of the normal to the base plane. The upright axis may move relative to the base according to the movement of the collision surface relative to the base. For example, the upright axis may pivot relative to the base, e.g. when a force is applied to the collision surface.

This dynamic associated with the collision surface, in which it may move in two orientations when a force is applied and in which the manner in which it may move varies during the movement is representative of real collisions during game play whereby the masses and orientations of opposing players may vary. By providing a training system in which a collision surface may pivot relative to a base on application of a force and wherein the collision surface may rotate about an axis that pivots relative to the base on application of a force, training of technique and core strength of a user in a collision scenario may be achieved. This dynamic arrangement demands strength, balance and adjustment which all must be sustained through an exercise.

Preferably, the apparatus is configured such that the collision surface is resiliently disposed relative to the base. The collision surface therefore preferably has a first, resting, position and second and further active positions after a force is applied and during an exercise and will, upon removal of the applied force to the collision surface, return to the first resting position. The first, resting, position is typically a position at an angle to the normal to the base plane and angled away from the base (toward the direction of approach of a user). The collision surface, which preferably has at least one, optionally planar, contact portion, may thus be disposed, in its first resting position, at an angle of at least 80° to the plane of the base, preferably at least 90°, more preferably at least 100° and optionally up to 135°, more preferably in up to 125° (i.e. up to 30° from the normal to the base plane and angled away from the base and toward the user and thus in a preferred embodiment the collision surface defines a closed inclined surface in which the collision surface is facing down to some degree in its resting position).

Optionally, the collision surface is resiliently mounted in relation to the upright axis about which it rotates, whereby it is biased to return to a starting position, or it may not be resiliently mounted. Preferably, the collision surface is passively resiliently mounted in relation to the upright axis by which it is meant that it is free to return to its starting position upon removal of an unbalanced force (which would cause it to rotate about the upright axis) by virtue of the angle of upright axis in the first resting position. By this arrangement, the need for balance and evenly applied force to the collision surface increases as the application of force increases, offering a very effective training arrangement.

The base may be any suitable shape and configuration. The base, for example, may be circular in plan, triangular, square or any other shape, it may flare outward in a longitudinal direction from the collision surface or taper inward in a longitudinal direction from the collision surface. Preferably the base is elongate.

Preferably, the collision surface is supported by a collision support structure, which collision support structure is disposed in relation to the base and preferably mounted on the base. The collision support structure preferably includes a linkage to allow or provide the relative movement (preferably pivotal movement) between the collision surface and the base, which may be defined as a first linkage. The collision support structure preferably includes a linkage which allows or provides the rotation of the collision surface about the upright axis, which is preferably a second linkage which may be the same or different to the first linkage, but is preferably different. Preferably the collision support structure has a longitudinal axis which defines the upright axis.

Preferably, the collision surface is provided on a collision member, which is preferably mounted on or supported by the collision support structure.

The collision surface and thus, preferably, the collision member is optionally interchangeable such that different collision members may be used according to specific training needs. In a preferred embodiment, the interchange of collision members may be facilitated by the disengagement and replaceability of the whole or part of the collision support structure. Any suitable collision member may be used as the collision member, such as those described in more detail below. Any suitable disengagement mechanism may be used such as those described in more detail below.

According to a preferred embodiment, the training apparatus has a collision surface and is movably responsive to a force transmitted by a user on collision surface during use, and the apparatus comprises:

a base for supporting the apparatus on a training surface, the base comprising one or more training surface-contacting members defining a base plane and extending in a longitudinal direction substantially aligned with the training surface; and a collision support structure extending upwardly from the base for supporting a collision surface to be impacted by a user during use;

and wherein the base is moveably responsive to force transmitted by the user to the collision surface;

and wherein the collision support structure includes a linkage to allow relative movement between the collision surface and the base, and wherein the linkage provides at least one predetermined limited degree of freedom of movement between the base and the collision surface when force is transmitted by the user to the collision surface.

The training apparatus will be described hereinafter with reference to this embodiments, but preferred features described are considered disclosed in relation to the broader aspects of the invention described above where the context allows.

The training apparatus according to one aspect of the invention comprises a base for supporting the apparatus on a training surface; a collision support structure extending upwardly from the base for supporting a collision surface for a user to impact; and a linkage allowing relative movement between the collision surface and the base. The linkage provides at least one predetermined limited degree of freedom of movement between the base and collision surface when force is transmitted by the user to the collision surface.

The base is preferably moveably responsive to the transmitted force in a direction extending along or substantially parallel to a direction extending from a proximal end towards a distal end of the base so as to move the base relative to the training surface. The base is preferably moveable relative to the training surface in a direction extending along or substantially parallel to a direction extending from a proximal end towards a distal end of the base, herein referred to as the collision direction, by an amount responsive to one or more of the angle and/or direction, height, position, strength/power and technique of a collision by a player on the collision surface.

The base may comprise any suitable surface-contacting members, such as for example a plate, runners, fins, wheels or rollers. The base may for example comprise a pair of spaced apart runner portions, each runner portion extending from or near a proximal end towards a distal end of the base (the proximal and distal ends being typically relative to the collision surface). Each runner portion of the base preferably has an inclined lip at a distal end thereof, whereby during a training exercise, players may lift the apparatus and the lip allows longitudinal movement and prevents the distal end from digging in and resisting forward movement. The base may comprise a sled.

Preferably, the base comprises a base plate arrangement which is preferably mounted on an upper side of the surface contacting members and provides one or more platform areas. Such a platform may be used to support additional weights as may be required. The base plate arrangement is preferably In one embodiment, which finds particular utility for fixed (e.g. indoor training) configuration rather than field configuration, the base may comprise a platform, in which a first end of the collision support structure extends upwardly from the platform; and a support frame, and in which the platform is moveable relative to the support frame in response to force transmitted by the user to the collision surface and wherein support frame may be fixed in position relative to the training surface.

The base may be of any suitable length. The length of the base may be any suitable length which gives structural integrity to the apparatus and allows it to remain upright during use. Preferably, the base is from 1 metre to 4 metres long, preferably 1.5 to 3 metres. The base member may be selected to be any suitable width, typically from 40 to 200 cm at its widest point, preferably 50 to 150 cm, more preferably 60 to 90 cm and more preferably up to 75 cm.

The base member may be constructed from any suitable material, e.g. composite material, protruded or extruded resin composite (e.g. with glass fibre, carbon fibre etc), or metal (e.g. steel, typically mild steel) parts. The components may be formed of solid, shaped or hollow sections. Preferably, base member comprises a base frame of steel square or rectangular hollow sections. The base plate member may be a moulded plastic or composite element, or a shaped sheet steel element and is preferably a mild steel plate element which preferably has a 6 mm check (with 4.5 mm on flat).

The collision support structure may be positioned or mounted at any suitable location on the base. Preferably, the collision structure is mounted at or near a proximal end of the base.

Preferably, the collision support structure extends by an amount from 50 to 200 cm upwards from the base member (e.g. the top of the collision surface is arranged to be 50 to 200 cm from the base member and the playing or training surface), more preferably at least 100 cm, e.g. from 100 to 180 cm, still more preferably from 120 to 140 cm. In preferred embodiment, the centre of mass of a collision member, bearing a collusion surface, is in the region 100 to 140 and preferably about 120 cm upward from the base.

The collision support structure may be a simple support member, for example an arm, or a pair of arms.

The collision support structure useable in any of the embodiments may be formed of any suitable material that is suitable for receiving collisions. Typically, the collision support structure is formed of a rigid frame and disposed thereon a collision member providing the collision surface, which collision member comprises a pad element. The pad element may be, for example, a shaped cover (e.g. of leather or synthetic leather, such as PVC, or textile or fabric, as is known in the art) attachable or fixed to the rigid frame and filled with an appropriate filler (e.g. fibrous filler, fabrics, wool, reconstituted foam or shaped foamed plastic filler), or may be for example a shaped pad of resilient or resiliently compressible foam material (e.g. polyurethane) coated with a synthetic coating material or a cover (of, e.g. leather or synthetic leather, such as PVC, or textile or fabric, as is known in the art). Preferably the coating material is a laminate such as a woven or textile fabric with a PVC coating.

As mentioned above, the collision surface may be a surface of a collision member mounted or for mounting on the collision support structure. The collision member may take any suitable form and collision members may be interchangeable. For example, the collision member may be selected from: a torso shaped portion, tackle bag cylinder and a half sphere portion. Optionally, the collision member comprise a tackle bag having gripping members disposed thereon. The collision member may comprise, e.g. on the collision surface, a visual guide to indicate its optimal collision zone (or sweet spot) to enhance training.

Interchangeability of a collision member may be facilitated by, for example, simply the ability to disengage a first collision member and replace with an alternative collision member to the same mounting mechanism as the first. Alternatively, the collision member interchangeability may be enabled by providing an upright support structure (such as a cylindrical or box-section bar or tube) that comprises a support portion and a removable portion. Thus, for example, a removable portion may comprise an insert that is received by the support portion (or vice versa) so that together a support structure is formed. In one embodiment of this arrangement, there may be provided a number of exchangeable collision members formed on elongate mountings that form a removable portion of a support structure which together with a support portion may form a support structure. Each exchangeable collision member may comprise a different collision member mounted on its respective removable portion and may be configured to be rotatable about the support structure or in fixed configuration relative to the support structure.

For example, in one embodiment the collision member is a padded elongate body having a first end and a second end and a side surface defining the surface of the body between the first and second ends being capable of being stood, self-supporting, on its first and/or second end, wherein the collision member further comprises at least one gripping protrusions formed on or part of the side surface. The gripping protrusion(s) should be sized so as to be grippable, but preferably shaped so as not to aid gripping. The gripping protrusions may be removable (e.g. attached by zip element or hook and loop arrangement), but preferably is fixedly formed onto or as part of the side surface. Preferably a plurality of gripping protrusions are provided, such as 2, 3 or 4 such protrusions and optionally 5 or more. Optionally, any arrangement of protrusions may be provided such as a plurality of semi-spherical protrusions (or cuboid equivalents) or an elongate helically arranged protrusion or protrusions. Preferably the protrusions are elongate members (or fins) running along the side surface in a direction from one end to the other and preferably extending from one end to the other. The body member may be any suitable shape and may be irregular in shape but is preferably a prism and more preferably a cylinder. The protrusions (or fins) are preferably extending in a direction (longitudinal axis) substantially parallel with the longitudinal axis of the elongate body member. The protrusions, which are preferably padded members sewn or otherwise affixed onto the elongate body member, are of any suitable shape but are preferably of circular, semi circular or other curved cross-section. The collision member may be sized to any suitable dimension, but preferably, the length (end to end) is in the range 50 cm to 1.5 m, more preferably 60 to 80 cm, whilst the width (diameter in the case of a cylinder) of the body member is preferably from 20 to 50 cm, preferably 25 to 40 cm. The protrusions should in any case be sized to be capable of being gripped, such has having a width of 3 cm to 15 cm, preferably from 5 to 10 cm and preferably 6 to 8 cm.

In another example of a collision member that may be configured for use in an apparatus of the invention, the collision member is in the form of a tackle shield having a body defining a front contact surface and a rear holding surface, and wherein the shield further comprises one or both of the following features:

the shield comprises two opposing lugs laterally disposed on the body; and the body has an angled or curved profile whereby the front contact surface has an upper forward projection and a lower forward projection and a recess therebetween.

According to this example, the tackle shield may comprise a body having an angled or curved profile whereby the front contact surface has an upper forward projection and a lower forward projection and a recess therebetween. Preferably, the shield also has two opposing lugs laterally disposed on the body.

The upper forward protrusion may alternatively be referred to as a head projection. The lower forward protrusion may alternatively be referred to as a lip projection. The upper and lower forward protrusions are preferably integral to the body and, optionally together with a central portion, define the body. The body, may alternatively be considered to comprise of a curved profile which defines an upper and lower forward projection.

Preferably, the body defines a curved profile, which is preferably substantially c-shaped.

The upper forward projection and lower forward projection are disposed at an angle to one another of up to 135 degrees (taking, for example in a curved body, a nearest fit line to the distal end of each projection through the respective third of the length of the body), preferably up to 105 degrees, more preferably up to 95 degrees, still more preferably up to 90 degrees. Preferably upper forward projection and lower forward projection are disposed at an angle to one another of at least 30 degrees, more preferably at least 45 degrees, still more preferably at least 60 degrees.

The upper forward projection and lower forward projection preferably define a volume in the recess therebetween, which may be defined as the volume within the recess as defined by the projections and a plane (e.g. if you placed the projections against a flat surface) of from 17.5 litres to 40 litres, preferably 20 litres to 35, more preferably up to 30 litres such as from 22 litres to 28 litres, more preferably 24 litres to 26 litres, such as about 25 litres. In a preferred embodiment, the volume of the recess is no more than about 27.5 litres. By having a more limited volume, according to a preferred embodiment, there is a tighter target for the user which thus forces a greater accuracy in the approach. At the same time there needs to be sufficient volume for the user torso (leading with the shoulder, typically) to extend into the volume of the recess during the training exercise.

Preferably the upper forward projection has a head distal end. Preferably the lower forward projection has a lip distal end being the end point of the lower forward projection.

Preferably, the distal ends of the upper and lower forward projections are separated by 35 to 60 cm, more preferably 40 to 50 cm and still more preferably 44 to 48 cm. The distal ends may extend to up to 45 cm from the rearmost surface (the handle area), more preferably up to about 40 cm, still more preferably up to about 38 cm and preferably at least 30 cm, e.g. about 35 cm.

The tackle shield preferably comprises a central portion from which the upper and lower projections extend. The lugs preferably extend from the central portion. The lugs may extend from a side surface of the body or may define both the lugs and the back surface in a single extended element. In any case, it is preferred that the lugs are disposed adjacent the rear surface. The lugs may serve a particular training purpose, since the coach or third party can clearly see when a shoulder-led tackle is effectively carried out since the player or user's head should be close to the body (e.g. to a side of the body) and will butt into the respective lug.

In one embodiment, the collision support structure may be arranged to provide a collision surface extending in any suitable direction prior to collision depending on the training requirements for a particular player and/or type of collision and/or type of collision surface. For example, the plane of the collision surface may be substantially aligned with a vertical direction, i.e. extending substantially perpendicular to the base plane, prior to collision. The plane of the collision surface may however be an inclined surface prior to collision. For example, the plane of the collision surface may be an open inclined surface, in which the collision surface is angled away from the vertical in such a way as the collision surface is 'open', i.e. facing up to some degree. Alternatively, and indeed preferably, the plane of the collision surface may be a closed inclined surface, in which the collision surface is facing down to some degree.

The collision surface may have any suitable shape such as for example an irregular surface which more closely represents the irregular collision surface in the game. The collision surface is preferably planar or defines a planar portion.

The collision surface is preferably moveable relative to the base in a direction and/or rotatable about an axis by an amount responsive to one or more of the angle and/or direction, height position, strength/power and technique of a collision by a user on the collision surface.

The movement of the collision support structure and collision surface responsive to a collision may be achieved by any suitable arrangements, one embodiment of which is described below.

The linkage preferably provides relative rotation between the collision surface and base. For example, the linkage may provide relative rotation between the collision surface and base about a transverse axis extending substantially perpendicular to the longitudinal axis of the collision support structure and parallel to the base plane. The linkage may provide relative rotation between the collision surface and base about a transverse axis extending substantially perpendicular to an axis extending between the proximal and distal ends of the base and parallel to the base plane.

Optionally, the linkage is configured to enable detachment of the support structure comprising the collision surface so that an alternative collision surface may be attached in exchange.

The collision support structure may be pivotally mounted on the base at or proximal to a first end of the collision support structure to be rotatable about the transverse axis. The collision support structure may be resiliently mounted on the base to provide resistance to rotation about the transverse axis. For example, the apparatus may comprise an adjustable resilient biasing mechanism to resist rotation of the collision support structure about the transverse axis. The resilient biasing mechanism may comprise an adjustable bungee system.

An adjustable bungee system as used in a preferred embodiment is adapted for use with two pivotally mounted parts (e.g. the collision support structure and the base). A collision support structure according to this preferred embodiment extends upwards from the base and the pivot mounting therewith to support a collision surface and the collision support structure comprises a projection extending below the pivot point (i.e. extending beyond the pivot mounting in a direction opposing the direction upon which the collision surface is supported). Disposed on the projection is a first bar or hook member (or members) onto which may be fixed, connected or wound a bungee. A corresponding second bar or hook member (or members) is disposed on the base of the training apparatus onto which may be fixed, connected or wound a bungee. This arrangement of the collision support structure and base is such that by resiliently biasing the extended projection of the collision support structure toward the base (and in particular the second bar or hook member of the base), the collision surface is resiliently biased toward the user, away from the body (and base) of the apparatus. The first and second bar or hook members, respectively mounted on the extended projection of the collision support structure and the base, are preferably resiliently biased by linking them with a resiliently extendable rod or cord, preferably a bungee cord. The bungee cord is typically an elasticated cord formed with a hook or connector at each end (typically suitable for connecting to the first and second bar or hook members). Different elasticities of bungee may be available in order to provide different degrees of resilience to the pivotally mounted collision support structure. Optionally, varying degrees of resilience may be achieved by attaching additionally bungee cords and/or stretching the bungee cord to extend from a second hook or bar, wound about a first hook or bar and back to the second hook or bar (and optionally wound thereabout and extended back to the first hook and bar and so on). The bungee system is particularly effective in the apparatus of the invention since the harder the user pushes against the collision surface, the greater force with which the collision surface tends to push back toward the user. An adjustable bungee system as described may compose a further aspect of the invention.

The apparatus preferably further comprises a setting mechanism for adjusting the initial angle of the collision surface relative to the base prior to collision. The setting mechanism may adjust the location of the transverse axis relative to the base. The setting mechanism may rotate the collision support structure about the transverse axis. The collision support structure may be pivotally mounted to the base and the setting mechanism may be arranged to adjust the position of the pivot. The setting mechanism preferably comprises a cam arrangement pivotable about a fixed axis on the base, the cam carrying the pivot of the support structure.

The setting mechanism preferably defines a selectable plurality of predetermined initial alignment angles between the base and the collision support structure and/or collision surface. For example, the initial angle formed between the longitudinal axis of the collision support structure and the plane of the base may be adjustable within the range 60° and 135°, more preferably between 95° and 120°, for example adjustable between discrete initial angles of 90 degrees, 105 degrees, and 115 degrees.

The degree of rotation of the collision support structure about the transverse axis when force is transmitted by a user may be limited to any predetermined value, preferably to between a maximum degree of rotation and a minimum degree of rotation. Preferably, the maximum degree of rotation on collision is no more than 45°, more preferably no more than 30° and optionally no more than 25°. Preferably, the minimum degree of rotation on collision is at least 5°, more preferably at least 15°. The collision support structure may be mounted such that the angle of the collision surface from the vertical is in the range of between 5° and 45°, more preferably up to 30° and still more preferably up to 25°.

A linkage preferably provides relative rotation between the collision surface and base about a longitudinal axis extending generally upward from base plane. The linkage preferably provides relative rotation between the collision surface and base about a longitudinal axis extending along or generally parallel to the longitudinal axis of the collision support structure.

A first end of the collision support structure may be mounted on the base, and a rotation collision assembly may be mounted at or near a second opposed end of the collision support structure to provide the means for rotation for the collision surface which may be configured with or mounted to the rotation collision assembly. The rotation collision assembly is preferably rotatable about the longitudinal axis of the collision support structure. The rotation collision assembly may be rotatable about an upright axis extending substantially parallel to the longitudinal axis of the collision support structure.

The maximum degree of rotation of the collision surface relative to the base about an upright axis is preferably adjustable. The maximum degree of rotation about the longitudinal axis is preferably adjustable between 45° and 90°, for example adjustable within a range of discrete maximum values comprising one or more of: 90 degrees, 67.5 degrees and 45 degrees.

The apparatus may further comprise at least one load attachment member arranged to receive one or more weight plates. One or more weights, e.g. weight plate fittings, water bladders or equivalent, may be provided on the base, e.g. towards the proximal end or distributed along the length of the base, such that weights may be added to increase the weight of the apparatus to simulate different weights of opposition. Preferably, the basic apparatus (without added weights) weighs at least 50 kg (which would be a suitable weight for an apparatus for training junior, e.g. under 18 year old, players), more preferably at least 90 kg (which would be a suitable minimum typical weight for training senior players, e.g. over 18 year olds) and optionally at least 120 kg (to suit bigger players, e.g. American Football players or Rugby forwards). In use, the weight of the basic apparatus can be supplemented with added weights as mentioned above to suit the player using the apparatus or the scenario being simulated.

The apparatus may further comprise one or a plurality of sensors provided in association with the collision surface in order to determine one or more of point of contact, duration of contact and strength of contact, to generate data relating to same and to communicate said data to a data analysis means.

The apparatus may further comprise one or a plurality of grip members disposed to enable a user to grip the grip member(s) at a plurality of positions about the periphery of the collision surface and/or collision member mounted on the collision surface. In one embodiment of the present invention, the apparatus is provided with one or a plurality of grip members, which grip members are preferably disposed to enable a user to grip the grip member(s) at one or a plurality of positions about the periphery of the collision surface. Such grip members may be provided at a plurality of positions about the periphery of the collision surface. In one embodiment, grip members are provided by single grip bar, e.g. curved grip bar, preferably an inverted U-shaped grip bar, which provides a plurality of grip members (or is provided as a single grip member a plurality of grip zones). The grip members may be selected from an upper grip member (along the top edge of the collision member), an upper transverse grip member (or pair of), a lower transverse grip member (or pair of), a punch-grip cross member (or pair of) (protruding laterally from the periphery of the collision member) and a lower grip member protruding forward toward the user from the bottom of or beneath the collision member. By providing a plurality of grip members, a player after having made initial contact in the collision can make a choice on different types of hand placement around the collision surface by gripping the grip member(s) at different positions, such as under grip, over grip, straight punch grip or mix and match.

The invention enables the collision surface and/or base to move in response to certain features of a collision, the effect of 'good' and 'bad' collision technique may be appreciated instantly by the player and the apparatus can be used to improve technique.

The apparatus may be configured or 'tuned' such that a sweet spot for collision is provided on the collision surface whereby direct, accurate and powerful collision by a player with the sweet spot of the collision surface provides one or more of: optimum movement of the base relative to the training surface, straight movement of the base relative to the training surface and/or minimal or no rotation of the collision surface about or generally parallel to a pre-defined upright axis. The apparatus may also be configured or 'tuned' such that a bad collision (i.e. an indirect, inaccurate and weak collision) with the collision surface provides one or more of: minimal or no movement of the base relative to the training surface, skewed movement of the base relative to the training surface and/or maximum or predetermined angle of rotation of the collision surface relative to the base about the upright axis, which will generally inhibit further application of force (or throw the user of course and off the collision surface).

Preferably, the apparatus may be used for repeat or successive collisions by the user or users after the apparatus has been repositioned post-collision. Accordingly, training techniques in collision may be practiced and successive collisions effected by team members can be practiced. The apparatus may further comprise a return mechanism to return the rotation collision assembly and/or the base to its initial position pre-collision. The rotation collision assembly may be resiliently biased to return to its initial position pre-collision.

By providing an apparatus in which the collision surface is rotatable, a player approaching a collision with the collision surface must work on providing a good contact at a predetermined spot or region on the collision surface and maintain good contact on application of force and good core strength and technique in order to avoid being thrown off the apparatus, in particular the contact surface, by rotation of the contact surface relative to the base. Thus, the apparatus may be used to develop a good technique.

As mentioned above, the apparatus is preferably configured such that the collision surface and/or base are moveably responsive to the collision features (e.g. to one or more of direction and/or angle, height position, strength/power and technique of a collision by a player). One general embodiment of this is discussed in more detail below. In a first embodiment, a field training embodiment, the collision surface is rotatable relative to the base, and the base is moveable relative to the training surface in response to a collision by a user.

In the first embodiment, which is particularly useful for field training, the base is an elongate member having a proximal portion, above at least a portion of which the collision support structure is disposed, and a distal portion. The apparatus is adapted such that the base is moveably responsive to user collisions on the collision surface. It is however to be understood that the collision support structure may optionally be moveable on a fixed base, e.g. by mounting the collision support structure on a short track located on the base along which the collision support structure or base may move resiliently from its initial resting point. The collision support structure may be mounted on a portion of a base which is moveable relative to the surface contacting members of the base in response to collision by a user. The surface contacting members may be fixed relative to the training surface during collision. However, it is preferable that in this embodiment the collision support structure is directly mounted by a linkage to a base which is moveably responsive to collision. Typically, the collision support structure is directly mounted at or near the proximal end of the base (i.e. within a proximal portion of the base).

In field training, the base, in particular the surface-contacting member(s) of the base, is configured to move along the training surface (e.g. grass surface or synthetic grass surface), the apparatus is responsive to a collision by a user.

If a 'good' collision is achieved, the base may move a corresponding amount in a collision direction (which is defined as a direction extending parallel to an axis extending from the proximal to the distal end of the base). The extent of movement may be controlled by the weight of the apparatus (and in particular of the base), which may be supplemented by supplemental weight and/or by the nature and/or configuration of a contact surface (for contacting a training surface) and the degree of freedom or resistance to movement imparted thereby.

If a player does not make contact with the collision member in the correct technical position (e.g. optimally collision zone) the impact will be lessened through the apparatus, for example the base will not move relative to the training surface, or movement of the base relative to the training surface will be reduced or skewed, and/or the collision surface will rotate about a longitudinal axis and throw the player from the collision surface. Thereby, the apparatus encourages and trains the player to make contact with the collision surface at an optimal collision zone. The apparatus provides instant feedback to the player with regards to the quality of their technique.

As mentioned above, the nature and configuration of the surface contacting members of the base may (at least in part) control the degree of resistance to movement of the apparatus in one or more directions along a training surface (e.g. turf). Preferably, the base comprises a pair of spaced apart runners for contacting the training surface, and may for example take the form of a sled. It is however to be understood that the base may comprise a base panel member for contacting the training surface (the underside of the base panel member providing the contact surface). The base panel member should have an underside to enable movement along the training surface. Optionally, the surface contacting members may be configured with base surface protrusions or contours which impart resistance to movement. Preferably, the shape and configuration of the base surface protrusions or contours may be selected to control resistance in different directions. Preferably, ridges or fins are provided on the contact surface, which preferably protrude downward and, to at least some degree, toward the proximal end (whereby they don't dig in and prevent all movement). The ridges or fins may be curved but are preferably straight and angled at a certain or varied angles to the longitudinal direction in the range from 0 degrees to 90 degrees. The position and angle of fins may be provided according to the desired effect on resistance to movement in longitudinal and non-longitudinal directions. For example, fins substantially parallel with (i.e. at 0° to) the longitudinal direction will favour longitudinal movement and resist non-longitudinal movement. Fins substantially perpendicular to the longitudinal direction will resist longitudinal movement and favour non-longitudinal movement. Hence the selection of fin position and configuration may allow the sensitivity of the apparatus to be controlled.

In a further embodiment, applicable to the invention and all the embodiments hereinbefore described, a training apparatus may be further provided with a sensor or arrangement of sensors for measuring, analysing and/or monitoring technique, performance and/or improvement over time.

According to this embodiment, there may be provided sensors at one or various locations about the collision surface of the collision member, whereby point of contact may be determined, as well as possible additional data relating to duration of contact and strength of contact. Similarly, sensors may be provided on any grip members (e.g. in padded elements provided on the grip members) to record where the grip takes place and optionally strength and duration of grip. Optionally, e.g. in the field training embodiment, the apparatus is provided with a sensor or device (e.g. in or in association with the base member) for determining one or more of distance, speed and direction of movement of the apparatus. Typically, the data generated by the sensor (s) will be transmitted by wireless communication via a receiver to e.g. a microprocessor. The data may then be analysed (e.g. by a software application) to determine factors of performance about the particular user, such as accuracy of hit and power within the initial hit, whether the power was maintained or fell away after initial impact, the strength that was demonstrated and the distance, speed and direction in which the apparatus was moved. Thus the strengths and weaknesses of a particular player's technique can be measured and, for example, a profile created. Thus exercises to improve on weaknesses can be identified, such as through identifying changes that would improve the particular player's technique as well as strength and conditioning programmes to improve the player's performance through the collision.

The arrangement of sensors may be useful in measuring the following:

The accuracy of the player making contact with the collision surface, e.g. 'is body height correct and consistent, especially when fatigued?';

The power that is generated in the initial collision with the collision surface;

The power that is generated after the initial hit; 'does the player keep the pressure on or does it fall away dramatically?'; and Optionally, there may be further sensors (or electronics) to determine the movement achieved.

Analysis can be used to determine improvements in training methods (e.g. to learn about the most efficient techniques and adapt training methods to accommodate them) as well as to adapt coaching on technique to meet a particular player's strengths and weaknesses thus maximizing each individual's potential. Further, methods may be developed for a particular team profile (collection of individual profiles) which may inform the most effective order and timing for joining a collision event in a game.

Sensors, typically pressure sensors, capable of determining applied pressure as well as, preferably, extent and duration of applied pressure should preferably be placed beneath the surface of the collision. Optionally, a multi-cell sensor element may be provided that covers a substantial portion and preferably the entire collision surface may be used and pressure data transmitted to a receiving device (e.g. a microprocessor) typically by wireless communication, where the data is analysed and presented back as output for immediate consumption by the user and/or the coach, e.g. in the form of number, graphs, charts or other visuals to illustrate the performance.

The invention will now be described in more detail, without limitation, with reference to the accompanying Figures.

In FIG. 1, a training apparatus 1 in accordance with one embodiment of the invention is illustrated as having an elongate base 3, in the form of a sled, with a distal portion 5 and a proximal portion 7. The sled 3 extends in a generally horizontal longitudinal direction such that it may firmly support the apparatus on the training surface in use. The sled 3 comprises a base frame which provides the rigidity and form and a base plate 8 mounted on the upperside of the base frame. The base frame provides two spaced apart runner portions 9, 9' which form the contact surface with the training surface (not shown, e.g. turf, clay or Astroturf). The pair of spaced apart runner portions 9, 9' each extend between the proximal 7 and distal 5 portions of the base 3. The distal end 10, 10' of each runner portion 9, 9' provides a lip.

A collision support structure in the form of a support arm 20 is mounted on and extends upwardly from the proximal portion 7 of the base 3. The support arm 20 carries towards its upper end a collision member 14 which has a collision surface 16 which is impacted by a user during use.

The collision member 14 may be mounted using any suitable means of attachment to the support arm 20, preferably via a mounting plate 12. The collision member 14 is preferably releasably attached to the collision support 9 by for example Velcro™ fastenings, poppers, or zip fastenings, or may be screwed onto a mounting plate 12 itself mounted onto the support arm 20. Robust fixings are preferred in view of the robust treatment the apparatus 1 will receive. The collision member 14 is in the shape of a torso providing a planar collision surface 16. The collision member 14 may be composed of, for example, polyurethane foam with a leather or synthetic leather jacket.

The sled 3 further comprises a load attachment member in the form of a stacking pin 4. The stacking pin 4 is located in or near the proximal end 7 of the sled 3. Weights (e.g. weight plates) may be placed onto the stacking pin 4 so as to control the strength of hit required to move the apparatus a certain distance on the surface.

As will be explained in detail below a first end 22 of the support arm 20 is connected to the sled 3 by a linkage 32 which allows the arm to resiliently pivot about a first, transverse axis A which extends substantially perpendicular to the longitudinal axis of the support arm 20 and parallel to the plane of the training surface (and base plane provided by the sled 3).

Figure 9:
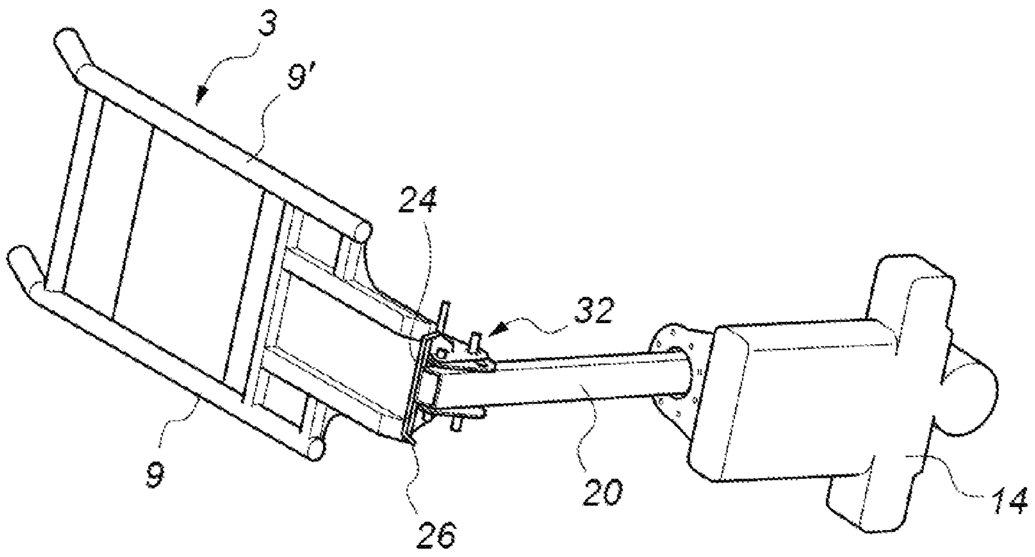
FIG. 9 is a perspective view from below of the training apparatus according to the invention illustrated in FIG. 1.
Figure 10:
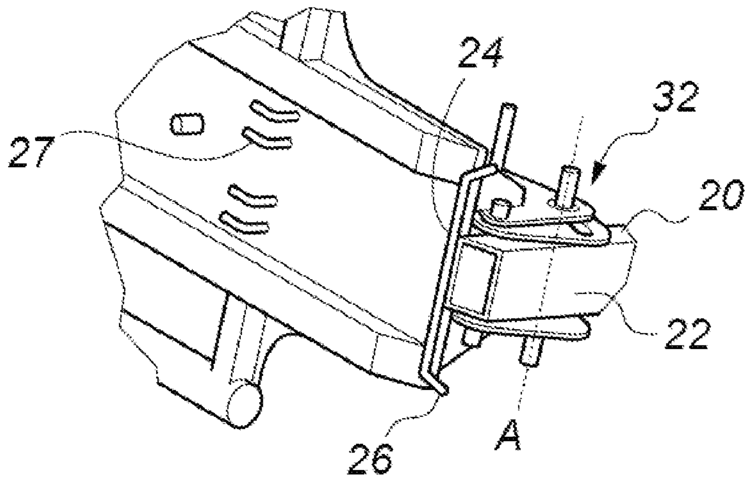
FIG. 10 is a perspective view from below of a bungee arrangement of the training apparatus according to the invention illustrated in FIG. 1.

A spring arrangement is provided to bias the support arm 20 in a forward position. The spring arrangement may for example utilise a bungee arrangement. With reference to FIGS. 9 and 10, the first end 22 of the support arm 20 is provided with a bungee attachment feature 24 in the form of a bar 25 with hooked ends 26 to retain a spring or bungee cord (not shown) thereon. A fixed attachment point 27 is provided on the sled 3 to receive the other end of the bungee arrangement. The bungee attachment feature is positioned below the pivot axis A of the arm 20 such that a resilient rearward tension force from the spring arrangement will bias the support arm 20 forwardly relative to the sled 3.

A further linkage 34 is provided which allows for relative movement between the mounting plate 12 for the collision member 14 and the sled 3 about a second, longitudinal, axis B extending along or generally parallel to the longitudinal direction of the collision support arm 20.

The apparatus specifically described may be fabricated from stainless steel or mild steel, preferably hollow, square, oblong or circular cross-section bars, sheet steel (e.g. for the base panel, which is preferably a 6 mm contoured chequered mild steel base panel), polyurethane foam (for the pad, e.g. reconstituted polyurethane) and leather or synthetic leather (e.g. PVC or PVC-coated woven fabric, for the pad jacket).

Figure 8:
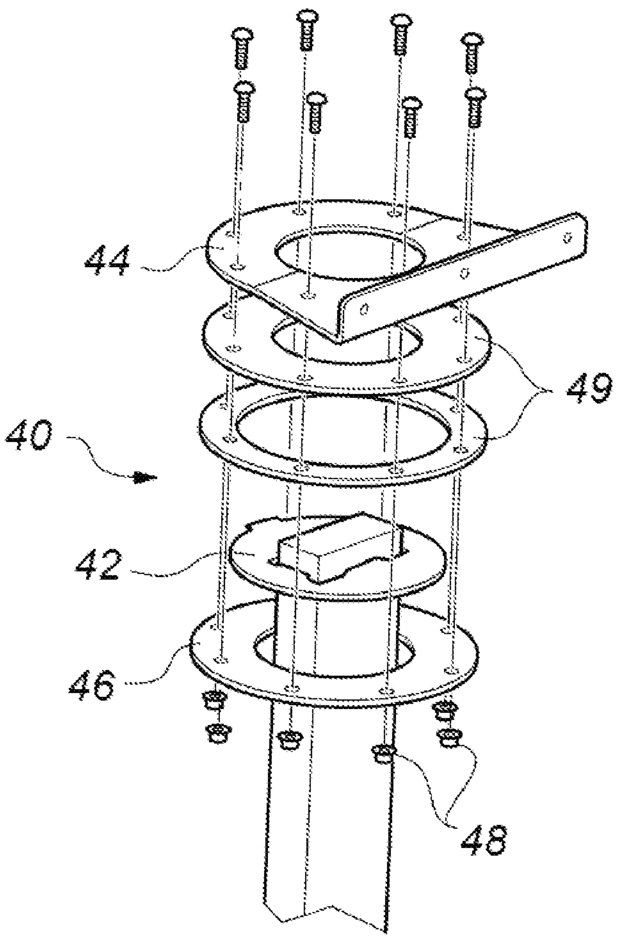
FIG. 8 is an exploded view of a rotation collision assembly of the training apparatus according to the invention illustrated in FIG. 1.

As noted above, in preferred embodiments a linkage 34 is provided such that the collision surface 16 and the mounting plate 12 are rotatable relative to the sled 3 about an axis B which extends along or generally parallel to the longitudinal direction of the collision support arm 20. As shown in FIG. 8 the linkage 34 may comprise an arrangement which rotatably connects the collision surface 16 via the mounting plate 12 to the support arm 20 such that the support arm 20 may be considered to be a "spindle" on which the collision surface 16, via the mounting plate 12 is mounted.

The linkage 34 may include a bearing assembly 40 provided on the support arm 20 to rotatably mount the mounting plate 12. In the illustrated embodiment a pair of bearing assemblies 40, 40' are provided which are spaced apart along the longitudinal length of the arm 20 but are substantially identical. Each bearing assembly 40, 40' comprises a non-rotatable member 42 which is fixed to the arm 20. The non-rotatable member 42 may have a keyed interface with the arm 20. For example, it may be noted that the arm 20 has a rectangular outer cross-sectional profile and that the non-rotatable member 42 has a corresponding profile. Alternatively or additionally, the non-rotatable member 42 could be non-rotatably fastened to the support arm 20, for example by welding. The bearing assembly 40, 40' further comprises a support plate 44, 44' which includes an interface (for example a flange) for connection to the collision member 14 or mounting plate 12. The support plate 44, 44' is attached to a retaining plate 46 which is positioned on the opposing side of the non-rotatable member 42 such that the non-rotatable member 42 is captive therebetween. As seen in FIG. 8, the retaining plate 46 and support plate 44, 44' may, for example be connected by a plurality of threaded connectors 48 which are spaced around the circumference of the retaining plate 46 and support plate 44, 44'. The non-rotatable member 42 has a lesser diameter than the retaining plate 46 and support plate 44, 44' such that the connectors 48 can freely rotate around the non-rotatable member 42 in use. It will be appreciated that to ensure smooth rotation and to meet any desired longitudinal tolerances, the bearing assembly 40, 40' may also include suitable spacer members, washers or bearing structures 49 sandwiched between the retaining plate 46 and support plate 44, 44' during assembly. Rotation of the retaining plate 46 and support plate 44, 44' relative to the arm 20 may be adjustably limited such that the maximum rotation of the collision surface 16 is set to a predetermined value.

Figure 5:
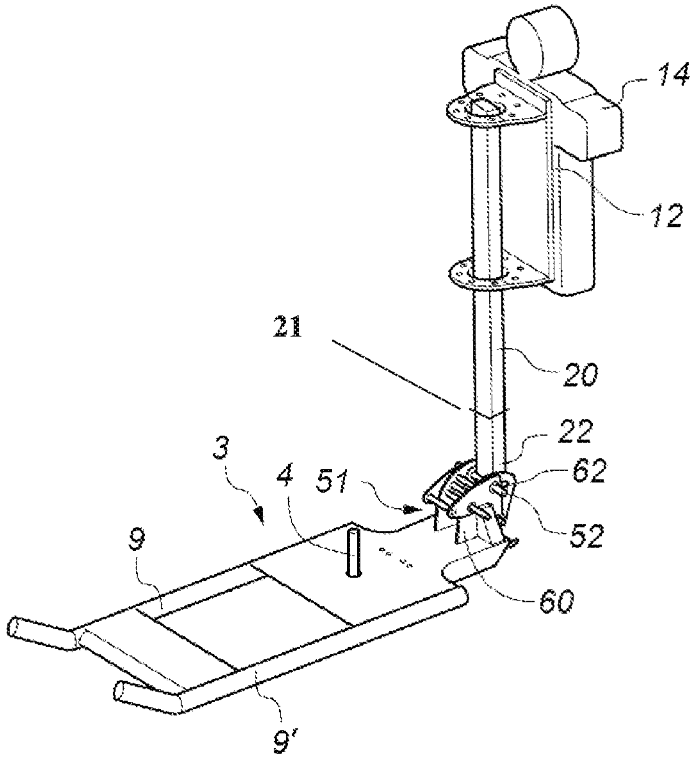
FIG. 5 is a further perspective view of a training apparatus according to a further embodiment of the present invention.

With particular reference to FIG. 5, it can be seen that at 21 there is a boundary of a lower end 22 (or support portion) of support arm 20 and an upper or exchangeable portion of support arm 20 to which a collision member defining collision surface 16 is mounted. The collision member may be exchanged by disengaging the upper or exchangeable portion of support arm 20 from the lower end 22 at separating boundary 21 (at which point an insert extending from the lower end 22 may protrude inside the upper or exchangeable portion of support arm 20.

Figure 6:
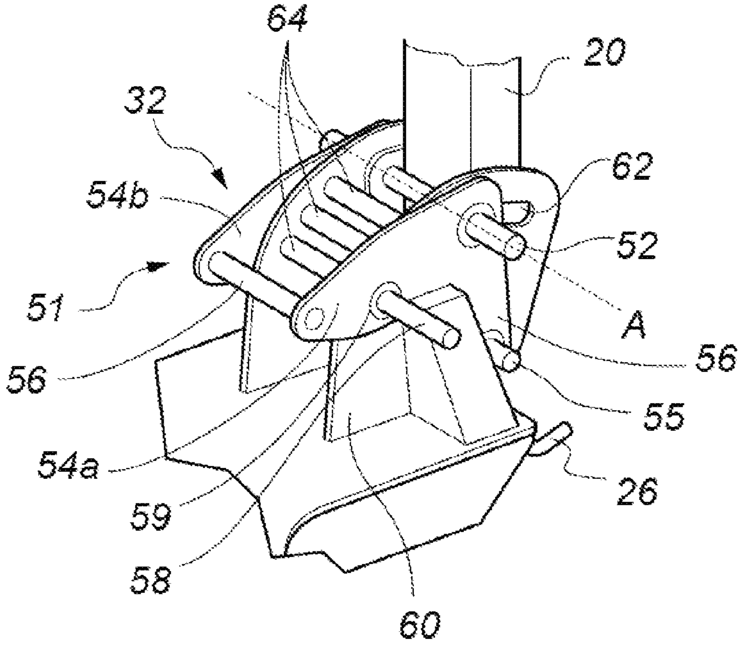
FIG. 6 is a perspective view of the linkage of the training apparatus of the invention illustrated in FIG. 1.
Figure 7:
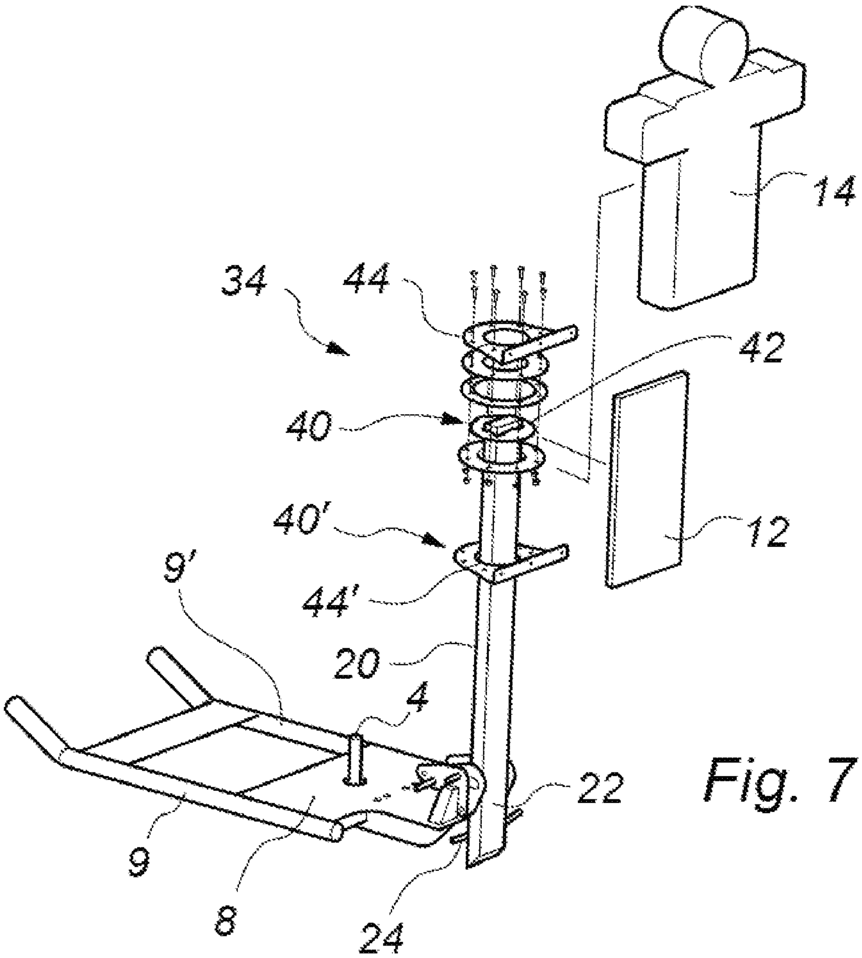
FIG. 7 is an exploded view of the training apparatus according to the invention illustrated in FIG. 1.

With particular reference to FIG. 6, the setting mechanism 50 for adjusting the initial angle of the support arm 20, and therefore collision surface 16, relative to the sled 3 prior to use will now be described. In a simple embodiment the setting mechanism could simply rotate the support arm 20 about its axis A (which is defined by a pivotable connection 52) to adjust the angle of the arm prior to use. However, such an arrangement would result in altering of the pre-tensioning of the bungee spring so would either require subsequent spring adjustment (which can be achieved, for example, by attaching further bungees, increasing the tension of the bungees or winding them about the fixing on more loops) or would give a different resilient response depending upon the pre-set angle selected.

Accordingly, the illustrated embodiment utilises a setting mechanism 50 which is arranged to adjust the location of the pivot axle 52 of the support arm 20 relative to the base 3. The setting mechanism 50 comprises a cam arrangement 51 consisting of a pair of spaced apart plates **54*a*, 54*b* which rotatably support the axle 52 of the arm 20. A lower portion 56 of the plates 54*a*, 54*b* is pivotably connected to the support base by a cam pivot axle 55. The cam pivot axle 55 is located relatively close to the lower end 22 of the support arm 20 (which it will be appreciated reduces the movement of the bungee attachment points 24 when the cam 51 is adjusted). The distal end of the cam plates 54*a*, 54*b* are connected by a transverse member 56 which provides a convenient holding point for the user during adjustment. A position setting pin 58 is provided which is removably insertable through a pair of opposing apertures 59 in the cam plates 54*a*, 54*b***.

The sled 3 includes a bracket 60 which is configured to receive and support the setting mechanism 50 and the support arm 20. The bracket includes a fixed arcuate slot 62 through which the pivot axle 52 of the support arm 20 extends. The arcuate slot 62 allows the pivot axle 25 to be moved through a range of positions relative to the sled 3 during adjustment and may also delimit the maximum and minimum angles of the support arm 20 relative to the sled 3. A series of predetermined support arm positions for example 5°, 15° and 25° from vertical, may be defined on the bracket 60. The predetermined positions may be provided by an array of apertures or tubes 64.

In use, the user may adjust the angle of the support arm 20 to a predetermined value by grasping the positioning handle 56 and removing the position setting pin 58 from the apertures 69 to free the cam arrangement 51. The cam may then be rotated about the cam pivot axle 55 to increase or decrease the angle of the support arm 20. As the cam 50 is rotated the pivot axle 52 moves along the arcuate slots 62 of the bracket. The user may bring the cam 50 into alignment with one of the predetermined positions provided by the apertures or tubes 64 of the bracket and re-secure the support arm 20 for use by inserting the setting pin 58 through the aligned apertures 59 and the chosen aperture or tube 64.

The user may then run towards and collide with the collision portion 20 on the collision surface 16 of the arm 20. If a 'good' collision is achieved, the base 3 moves a corresponding amount in a collision direction (which is defined as a direction extending parallel to an axis extending from the proximal to the distal end of the base). The extent of movement may be controlled by the weight of the apparatus (and in particular of the base 3), and any additional weights placed on the load attachment member and/or by the nature and/or configuration of a contact surface (for contacting a training surface) and the degree of freedom or resistance to movement imparted thereby. The support arm 20 may also pivot to a predetermined degree about pivot axle 52 in response to the collision force.

If however the user does not make contact with the collision portion 20 on the collision surface 16 of the arm 20 in the correct technical position (e.g. optimally collision zone) the impact will be lessened through the apparatus 1. In particular, the base 3 will not move relative to the training surface, especially not in the desired collision direction, or movement of the base 3 will be reduced. Furthermore, the collision portion 20 will rotate as a result of linkage 34 about longitudinal axis B of the arm 20 causing the player to be thrown away from the collision surface. Thereby, the apparatus encourages and trains the player to make contact with the collision surface at an optimal collision zone. The apparatus provides instant feedback to the player with regards to the quality of their technique.

Figure 11:
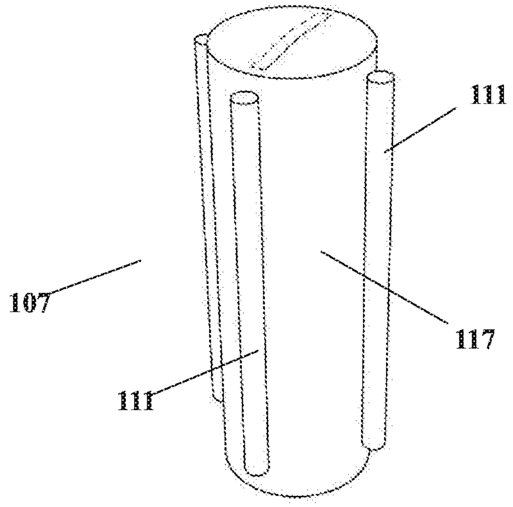
FIG. 11 is a perspective view of an alternative collision member for use in a training apparatus of the invention.
Figure 12:
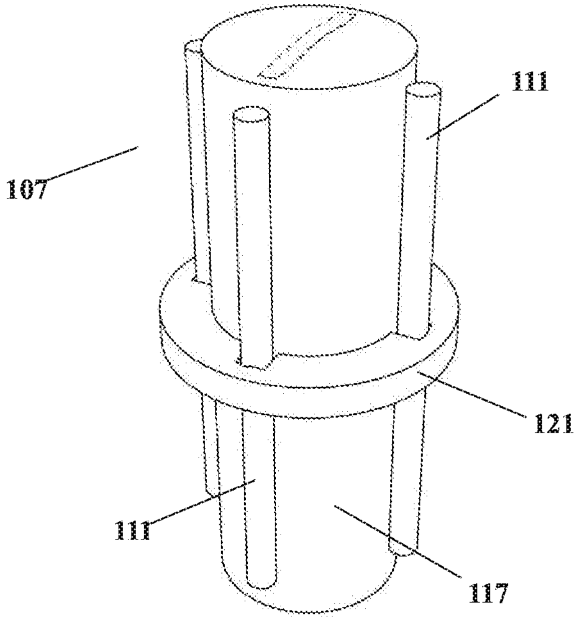
FIG. 12 is a perspective view of another alternative collision member for use in a training apparatus of the invention.
Figure 13:
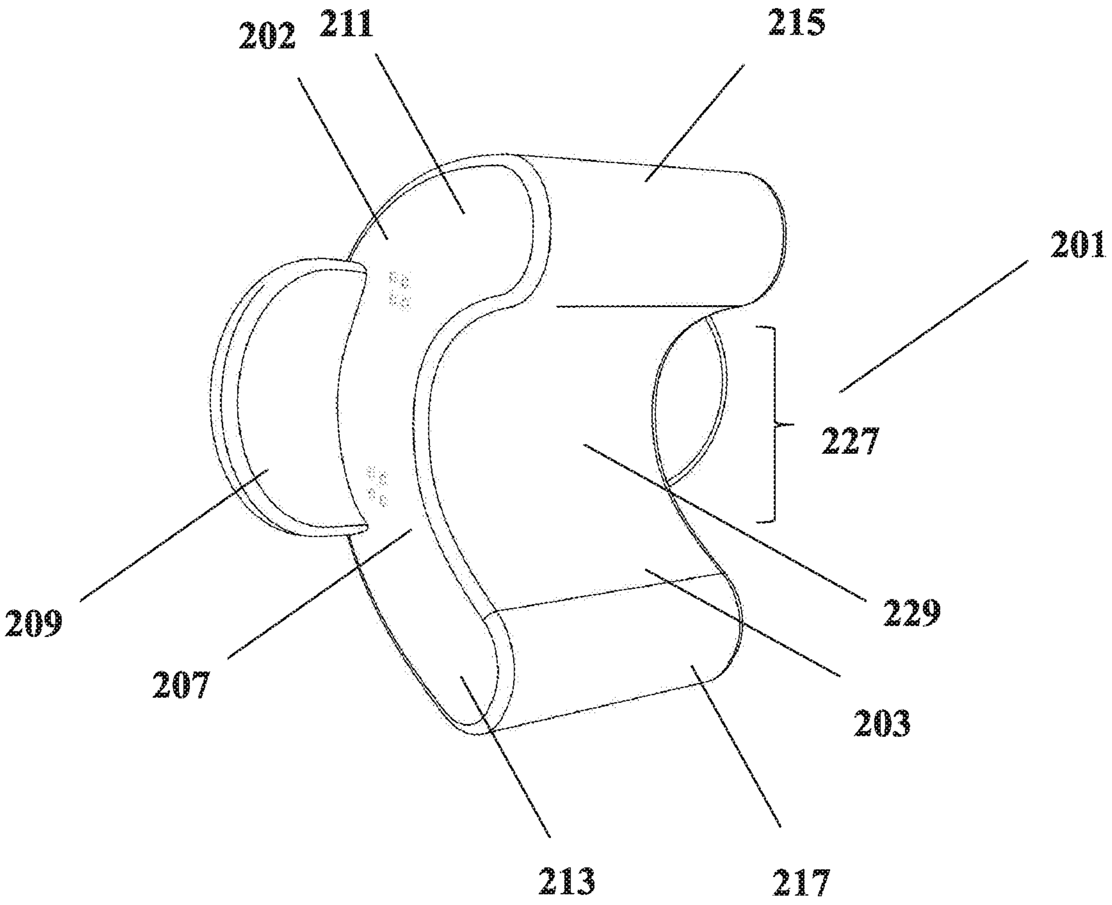
FIG. 13 is a perspective view of a yet further alternative collision member for use in a training apparatus of the invention.

FIGS. 11 to 13 illustrate alternative collision members which may be used in the apparatus (e.g. as exchangeable collision members).

In FIG. 11, the collision member comprises a padded elongate tackle and grip training apparatus 107 having four elongate gripping members 111 (of substantially circular profile) disposed along the major portion of the length of curved body surface 117 (the side surface of the cylindrical body member). The elongate gripping members 111 have a longitudinal axis parallel to the longitudinal axis of the elongate cylindrical body. In use, the collision member 7 may be 'tackled' by a player with a view to gripping at least one elongate gripping member 111 and turning and holding the apparatus during the 'tackle' thus exercising and practicing tackle technique, gripping technique and holding strength.

In FIG. 12, a guiding flange 121 is a generally torus shaped or ring-shaped member or may be best described as truncated tubular member which is preferably a unitary member (typically formed of a foam element having a coating or a coat thereon). The guiding flange 121 is configured in position to snugly fit onto the collision member 7 of FIG. 11 with its inner surface contacting or abutting the body surface 117 of the apparatus 107 and having elongate notches of square or rectangular profile formed therein having a width and radial outward extent of at least the same as the elongate gripping members 111 of the apparatus 107 so as to accommodate the elongate gripping members 111 in the notches (or recesses). Upper and lower surfaces bound by outer surface define the remainder of the guiding flange 121. The proportions of the flange 121 and apparatus 107 should extend sufficiently to be robust and to define at tackling area and for it to be quite apparent when the tackler has not properly targeted the tackling area. Thus, the guiding flange 121 may be moved along the length of the apparatus 107 to one or more desired positions, which may optionally be indicated by markings on the body surface 117 of the apparatus 107.

In FIG. 13, the exchangeable collision member may comprise a tackle shield 201 shown in perspective front view having a C-shaped body member 202 defining a front contact surface 203 and a rear surface separated by side surface 207. Projecting from the side surface 207 adjacent the rear surface 205 are two opposing lugs, defining a segment of an oval. The C-shaped body 202 has a central portion 227 and extending forward therefrom to define the C-shape therewith are upper forward projection 211 and lower forward projection 213 ending at respective distal ends 215,217. Defined between projections 211,213 is recess 219 into which the player training for tackles will move up into the recess 219 beneath the upper forward projection 211 and make contact with the front contact surface 203 within the recess.

The invention has been described with reference to a preferred embodiment. However, it will be appreciated that variations and modifications can be effected by a person of ordinary skill in the art without departing from the scope of the invention.

The invention claimed is:

1. A training apparatus having a form of a training sled comprising a base for supporting the apparatus on a training surface, the base comprising one or more training surface-contacting members defining an elongate base plane and extending in a longitudinal direction aligned with the training surface, the base having a first end and a second terminal end, the base defining a longitudinal axis from the first end to the second terminal end, and the second terminal end of the base having an upturned lip relative to the one or more training surface-contacting members;

a collision support structure in the form of a rigid arm, which at one end is pivotally and resiliently mounted on the base at the first end of the base such that the rigid arm is rotatable about only a single transverse axis in relation to the longitudinal axis of the base and the rigid arm extends upwardly from the base, wherein a biasing mechanism tensioned between an underside of the base and around the first end of the base to the collision support structure below the single transverse axis to resist rotation of the collision support structure about the transverse axis and to bias the collision support structure or rigid arm to pivot toward the first end of the base;

a collision surface disposed in an upright arrangement relative to the base and supported by the rigid arm at a second end thereof distal from the base, and centered about an upright axis of the rigid arm, the collision surface configured to rotate about an upright longitudinal axis of the rigid arm only when an off-axis force is applied to the collision surface; and wherein the base is movable along a training surface responsive to force transmitted to the collision surface and configured to slide non-parallel to the longitudinal axis when an off-axis force is applied to the collision surface, and translate as the force is transmitted and is configured to slide parallel to the longitudinal axis when an on-axis force is applied to the collision surface and translate as the force is transmitted.

2. A training apparatus according to claim 1, wherein the training apparatus is a blocking sled.

3. A training apparatus according to claim 1, in which the apparatus comprises an adjustable resilient biasing mechanism to resist rotation of the collision support structure about the transverse axis.

4. A training apparatus according to claim 3, in which the resilient biasing mechanism comprises a bungee cord or plurality of bungee cords.

5. A training apparatus according to claim 1, further comprising a setting mechanism for adjusting an initial angle of the collision surface relative to the base prior to use.

6. A training apparatus according to claim 5, wherein the setting mechanism adjusts a location of the transverse axis relative to the base.

7. A training apparatus according to claim 5, wherein the setting mechanism adjusts a position of the pivot.

8. A training apparatus according to claim 7, wherein the setting mechanism comprises a cam arrangement pivotable about a fixed axis on the base, the cam carrying the pivot of the support structure.

9. A training apparatus according to claim 5, wherein the setting mechanism defines a selectable plurality of predetermined alignment angles between the base and the collision support structure.

10. A training apparatus according to claim 5, in which the initial angle formed between the longitudinal axis of the collision support structure and the plane of the base is adjustable between 95 degrees and 115 degrees.

11. A training apparatus according to claim 1, in which the degree of rotation about the transverse axis when force is transmitted by a user is limited to no more than 25 degrees.

12. A training apparatus according to claim 1, in which the degree of rotation about the transverse axis when force is transmitted by a user is limited to at least 5 degrees.

13. A training apparatus according to claim 1, in which the base comprises a base plate mounted on a pair of spaced apart runner portions, each runner portion extending from or near a proximal end towards a distal end of the base.

14. A training apparatus according to claim 13, in which each runner portion has an inclined lip at a distal end thereof.

15. A training apparatus according to claim 1, in which the base comprises a platform, in which a first end of the collision support structure extends upwardly from the platform; and a support frame, and in which the platform is moveable relative to the support frame in response to force transmitted by the user to the collision surface.

16. A training apparatus according to claim 1, further comprising at least one load attachment member arranged to receive one or more weight plates.

17. A training apparatus according to claim 1, wherein the collision surface is a surface of a collision member mounted on the collision support structure.

18. A training apparatus according to claim 1, further comprising one or a plurality of sensors provided in association with the collision surface in order to determine one or more of points of contact, duration of contact and strength of contact, to generate data relating to same and to communicate said data to a data analysis means.

19. A training apparatus according to claim 1, wherein the base comprises foot placement recesses either side of the position at one end thereof at which the rigid arm is pivotally and resiliently mounted.

20. A training apparatus according to claim 1, further comprising a plurality of fixed attachment points on the underside of the base.

* * * * *